(12) United States Patent
Hudson et al.

(10) Patent No.: US 9,134,008 B2
(45) Date of Patent: Sep. 15, 2015

(54) LIGHT EMITTING DECORATIVE PANELS

(75) Inventors: William J. Hudson, Pleasaton, CA (US); Christopher B. Schmidt, Oakland, CA (US); David B. Small, San Jose, CA (US)

(73) Assignee: Shoot the Moon Products II, LLC, Pleasanton, CA (US)

( * ) Notice: Subject to any disclaimer, the term of this patent is extended or adjusted under 35 U.S.C. 154(b) by 574 days.

(21) Appl. No.: 12/899,343

(22) Filed: Oct. 6, 2010

(65) Prior Publication Data

US 2012/0087145 A1     Apr. 12, 2012

(51) Int. Cl.
   *F21V 8/00*     (2006.01)
   *F21V 11/00*    (2015.01)
   *F21Y 105/00*   (2006.01)

(52) U.S. Cl.
   CPC ................ *F21V 11/00* (2013.01); *G02B 6/006* (2013.01); *G02B 6/0036* (2013.01); *G02B 6/0038* (2013.01); *F21Y 2105/00* (2013.01)

(58) Field of Classification Search
   CPC ..... F21V 1/00; F21Y 2105/00; G02B 6/0036; G02B 6/0038; G02B 6/006
   USPC ......... 362/612, 601, 605, 610, 616, 620, 626, 362/806, 330
   See application file for complete search history.

(56) References Cited

U.S. PATENT DOCUMENTS

| | | |
|---|---|---|
| 2,313,489 A | 3/1943 | Latrobe |
| 2,807,111 A | 9/1957 | Turner |
| 3,338,730 A | 8/1967 | Slade et al. |
| 3,876,293 A | 4/1975 | Ramos |
| 4,043,636 A | 8/1977 | Eberhardt et al. |
| 4,105,293 A | 8/1978 | Aizenberg et al. |
| 4,440,814 A | 4/1984 | Wolters |
| 4,737,896 A | 4/1988 | Mochizuki et al. |
| 4,779,166 A | 10/1988 | Tanaka et al. |
| 4,803,696 A | 2/1989 | Pepper et al. |
| 5,032,003 A | 7/1991 | Antes |
| 5,128,842 A | 7/1992 | Kenmochi |
| 5,291,317 A | 3/1994 | Newswanger |
| 5,390,085 A | 2/1995 | Mari-Roca et al. |
| 5,390,276 A | 2/1995 | Tai et al. |
| 5,528,709 A | 6/1996 | Koike et al. |
| 5,536,558 A | 7/1996 | Shelton |
| 5,584,556 A * | 12/1996 | Yokoyama et al. ........... 362/625 |

(Continued)

OTHER PUBLICATIONS

"Office Action Dated Nov. 6, 2014; U.S. Appl. No. 13/277,029", (Nov. 6, 2014).

*Primary Examiner* — Sharon Payne
(74) *Attorney, Agent, or Firm* — Blakely Sokoloff Taylor & Zafman LLP

(57) ABSTRACT

Light emitting decorative panels using a light source at the edge thereof that may have a desired uniformity of light emission from a pattern thereon, and which are not subject to local shadows (shading) in a pattern part from patterns or pattern parts between the respective pattern or pattern part and the light source. The elimination of shading is achieved by the depressions of a given geometry disposed in an arc having a center at the light source, and sizes each depression or arc segment of a depression in being chosen accordance with 1), the distance of the respective depression or depression segment from the source of light, and 2), the number of depressions between the respective depression and the source of light, with a second order correction for the position of depressions between the respective depression and the source of light.

19 Claims, 5 Drawing Sheets

(56) References Cited

U.S. PATENT DOCUMENTS

| | | | |
|---|---|---|---|
| 5,743,616 A | 4/1998 | Guiliano et al. | |
| 6,185,356 B1 | 2/2001 | Parker et al. | |
| 6,315,440 B1 * | 11/2001 | Satoh | 362/561 |
| 6,582,095 B1 | 6/2003 | Toyoda | |
| 6,609,809 B2 | 8/2003 | Ohkawa | |
| 6,631,998 B2 * | 10/2003 | Egawa et al. | 362/612 |
| 6,685,329 B2 * | 2/2004 | Kim et al. | 362/626 |
| 6,712,481 B2 | 3/2004 | Parker et al. | |
| 6,827,456 B2 * | 12/2004 | Parker et al. | 362/629 |
| 7,018,088 B2 * | 3/2006 | Yu et al. | 362/620 |
| 7,195,389 B2 | 3/2007 | Parker et al. | |
| 7,252,427 B2 | 8/2007 | Teng et al. | |
| 7,354,184 B2 | 4/2008 | Parker | |
| 7,452,119 B2 * | 11/2008 | Onishi et al. | 362/620 |
| 7,695,152 B2 | 4/2010 | Chang | |
| 7,806,578 B2 * | 10/2010 | Kamikatano et al. | 362/601 |
| 7,810,980 B2 * | 10/2010 | Kanade et al. | 362/613 |
| 7,909,485 B2 * | 3/2011 | Chuang | 362/330 |
| 8,011,819 B2 * | 9/2011 | Yue | 362/615 |
| 2009/0034293 A1 | 2/2009 | Parker | |

\* cited by examiner

LIGHT EMITTING DECORATIVE PANELS

BACKGROUND OF THE INVENTION

1. Field of the Invention

The present invention relates to the field of light emitting transparent panels.

2. Prior Art

Light emitting transparent panels of various kinds are known in the art. See, for instance, U.S. Pat. Nos. 2,807,111, 3,338,730, 3,876,293, 4,043,636, 4,440,814, 5,536,558, 7,195,389 and 7,354,184. Such panels are normally illuminated at one or more places along an edge thereof by any of various light sources, including light emitting diodes. Most of the light from the light sources in a transparent panel with flat, parallel surfaces will have a shallow enough angle to continuously reflect from the surfaces of the panel and be confined within the panel. The light that does not have a sufficiently shallow angle will be emitted from the light panel very near the light source, and can be shaded to blackened out there. However, given a pattern of light extracting deformities or disruptions in the surface of the panel, some of the light within and passing along the panel will be interrupted and redirected outward from the surface of the panel and made visible to one looking at that surface of the panel. The light extracting deformities in the prior art have been formed by etching or molding. The size, shape and other characteristics of these deformities or disruptions may take various forms and have, in the prior art, been made of uniform size, or of increasing size with increasing distance from the light source.

One of the problems with the prior art methods of forming such light emitting panels has been the problem of obtaining uniform illumination of the pattern or patterns on the panels. In particular, even when using light emitting deformities on the panels that are of increasing size with increasing distance from the light source, the leading edge of such patterns, that is, the edge closest to the light source, tends to be brightest, with the illumination of the pattern decreasing from there across the pattern. It is these two combined effects, namely, the shadowing or shading as just described, coupled with general brightness which decreases with increase in distance from the light source that has been a major obstacle in the prior art, as the shadows caused by such shading appear to radiate from the light source and are immediately identifiable by an observer as not an intended part of the decorative pattern.

DETAILED DESCRIPTION OF THE PREFERRED EMBODIMENTS

Figure 1:
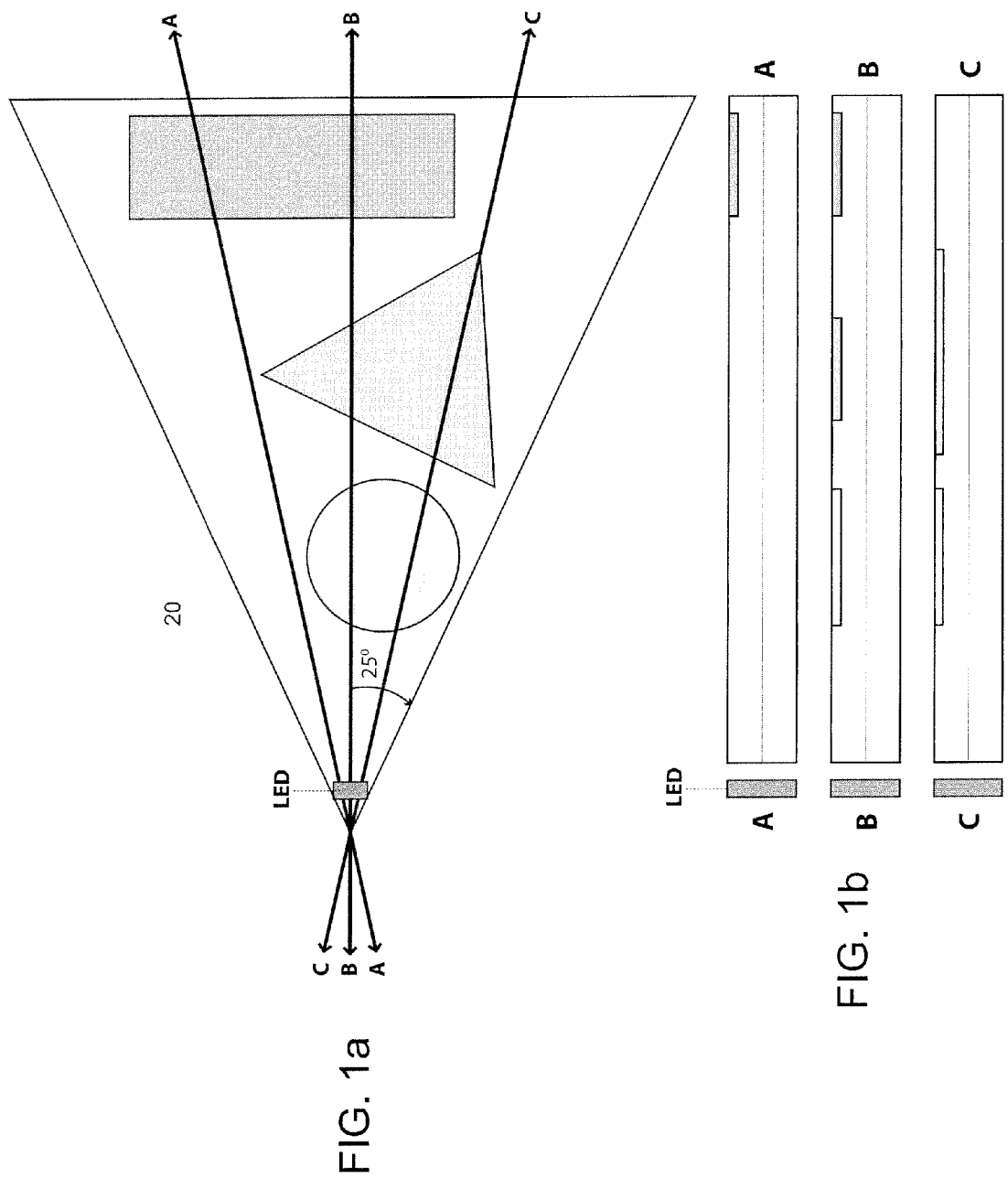
FIG. 1a is a face view of an exemplary pattern formed in a surface of a clear plastic panel.
FIG. 1b is a schematic cross section of the clear plastic panel along ray B of FIG. 1a illustrating the etched patterns therein.

Examples of what has been done in the prior art or tried by applicant may be seen in FIGS. 1a through 4 using a simple exemplary pattern for illumination, specifically, a circle, a triangle and a rectangle. As shown in FIG. 1a, a simple, generally triangular shaped clear plastic member 20 is illuminated from the edge by an LED (light emitting diode) 22, with the circular, triangular and rectangular patterns etched therein to a uniform depth as shown in FIG. 1b. However, such a configuration results in the etched portions closest to the light source being brightest and diminishing as the distance from the light source (LED) increases. Further, patterns closest to the light source effectively shade the patterns therebehind so that, by way of example, the portion of the rectangular pattern illuminated by ray A, which is uninterrupted by any intermediate pattern, will be substantially brighter than the portion of the rectangular pattern illuminated by ray B because of its first illuminating the circular pattern and the triangular pattern. For all three rays A, B and C, any part of any pattern illuminated by the ray will be darkened by any prior pattern or pattern part illuminated by the ray.

Figure 2:
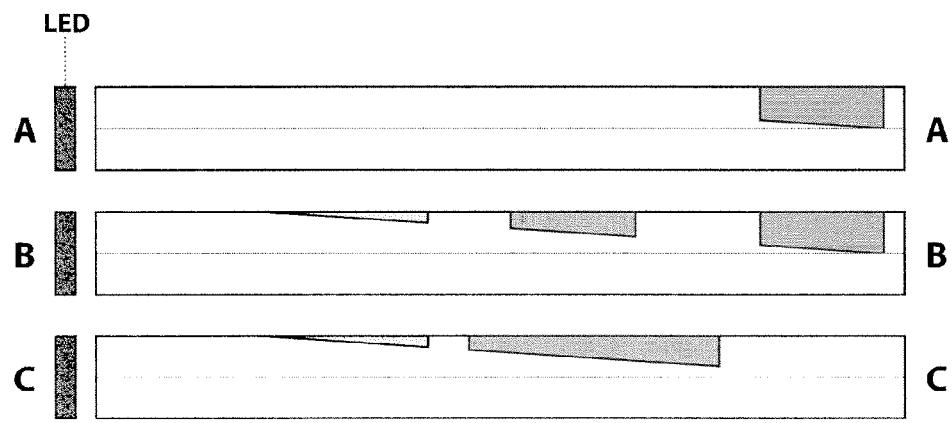
FIG. 2 is a cross section like that of FIG. 1b but wherein the etched patterns are etched to thicknesses varying with the distance from the LED light source.
Figure 3:
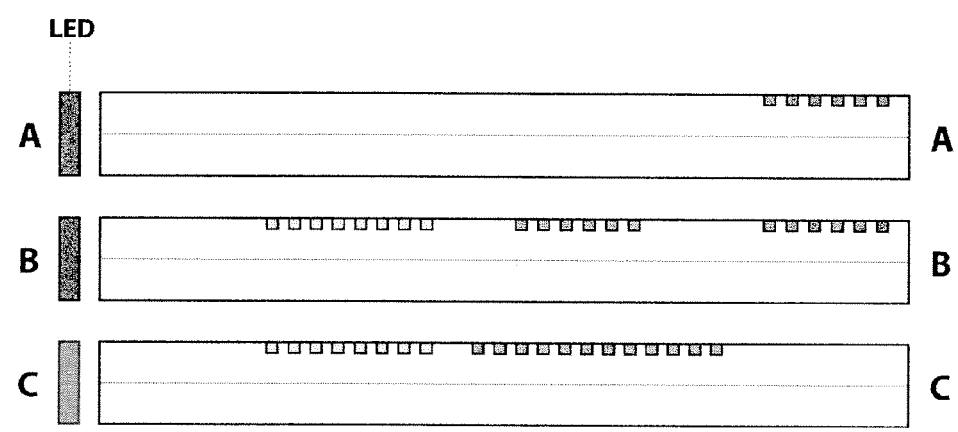
FIG. 3 is a cross section like that of FIG. 1b but wherein the patterns are created by etched spots.
Figure 4:
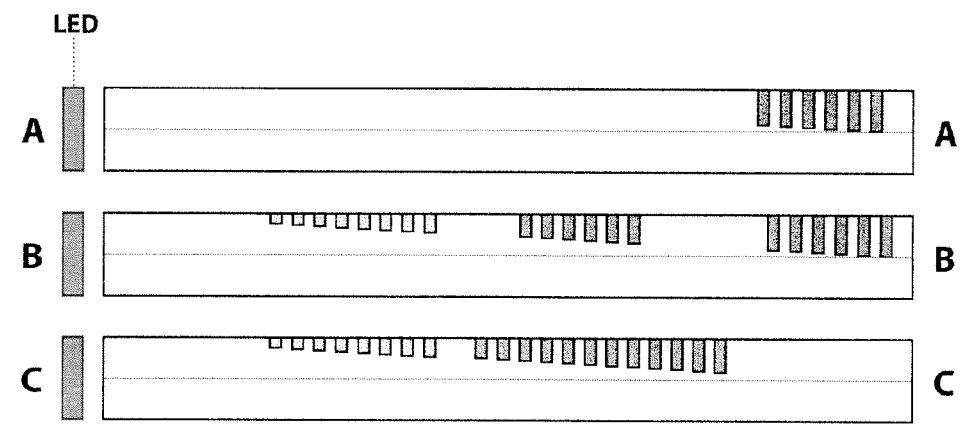
FIG. 4 is a cross section like that of FIG. 1b but wherein the patterns are created by etched spots of uniformly increasing depth.

In FIG. 2, the etched patterns are etched to depths varying with the distance from the LED light source in an attempt to provide more uniform illumination of the pattern. Here too, however, the pattern brightness varies with distance from the light source, and again, shadows are created on a pattern having any intermediate pattern between it and the light source. In FIG. 3, the patterns are created by etched spots, rather than uniformly etched areas, though here again, whether the etched dots are of uniform depth as shown in FIG. 3 or of increasing depth with distance from the LED as shown in FIG. 4, the resulting pattern illumination again varies with distance from the LED light source and includes shadows of any intervening patterns.

Figure 5:
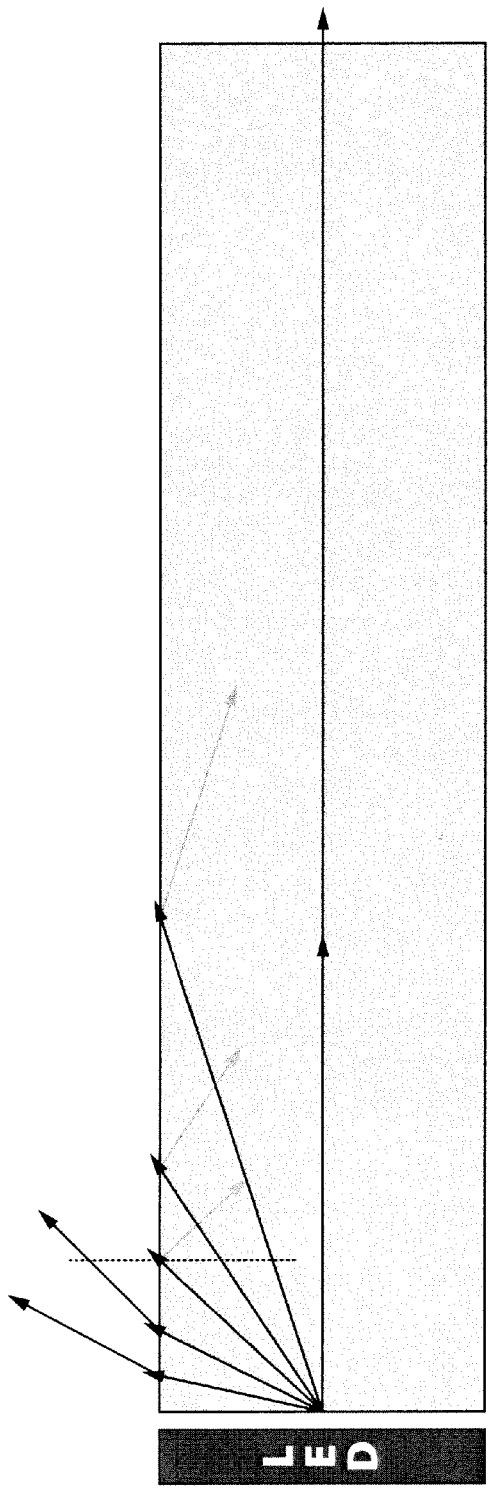
FIG. 5 is a schematic illustration of the coupling of the light into a transparent panel.

Now referring to FIG. 5, a schematic illustration of the coupling of light from and LED into a transparent panel, in one embodiment a clear acrylic panel, may be seen. In one embodiment of the invention, the light is air coupled to the panel, but other coupling could be used if desired. FIG. 5 is a schematic illustration only in the sense that emission from the surface of the LED is in all directions from over the entire radiant area of the LED surface, not located at a single point at the center of the LED as illustrated. Also of course, what is illustrated in the upper half of the Figure also applies to light originating in a downward direction. The important thing to note in this Figure is that light impinging on the upper or lower surface of the panel above a given angle is refracted and passes out of the panel, whereas light emitted at a shallower angle has 100% total internal reflection inside the panel. Total internal reflection occurs when a ray of light strikes a medium boundary at an angle larger than a particular critical angle with respect to normal to the surface. If the refractive index is lower on the other side of the boundary, no light passes through this boundary and all the light is 100% internally reflected. The critical angle for acrylic with an air boundary is approximately 42 degrees. The light emitted from the panel because of its excessive angle is obviously limited to a short distance on the panel. This area of the panel may be blackened or shaded so that that the refracted light very near the light source is not visible by a viewer of the panel.

Figure 6:
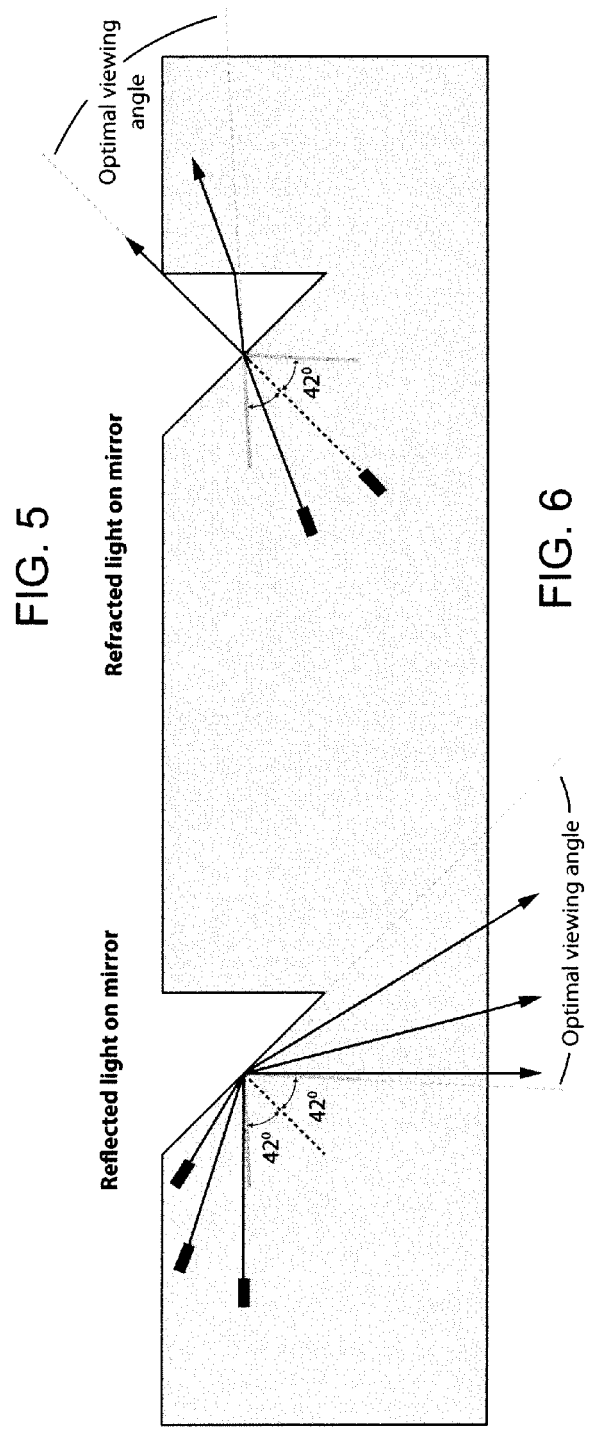
FIG. 6 illustrates the effect of a specific configuration of a depression in a first surface of a panel.

FIG. 6 illustrates the effect of a specific configuration of a "deformity" in a first surface of the panel. This deformity shall hereafter be referred to as a depression, as opposed to deformity, because of its relative predetermined and intentional geometry, as opposed to an etched deformity. In FIG. 6, the depression is triangular in shape, having a first inclined portion and a vertical portion. In one embodiment, the inclined portion has an angle of approximately 45 degrees with respect to the local surface of the panel. As shown at the left of FIG. 6, the first inclined portion of the depression acts like a mirror and will reflect any light that impinges on the surface at an angle greater than the critical angle, in this case 42 degrees. This reflected light will travel through the second surface of the panel as this light will impinge the second surface at an angle less than the critical angle. Note that the amount of light (fraction of the light in the panel) passing out the second surface of the panel depends on the depth of the depression as well as the angle that the light impinges on the inclined surface. As illustrated in the right side of FIG. 6, light that impinges on the inclined surface at an angle less than the critical angle will passes through the boundary and will escape from the first surface of the panel, and some of the light passing out of the inclined surface is captured by the vertical surface and again internally confined to the panel.

Referring again to the left side of FIG. 6, it will be noted that the viewing angle is limited primarily to one side of a vertical to the second surface of the panel. This viewing angle, however, may be substantially broadened by making the inclined surface of the depressions somewhat irregular or roughened. In a preferred embodiment, the panels are injection molded, so the irregularities or roughening are made part of the mold, and thus once set as desired, are simply replicated panel after panel as part of the manufacturing process. Alternatively other manufacturing methods might be used, such as some form of embossing, such as hot embossing or hot plate embossing. Prototypes may be made by laser cutting the desired pattern into the panel.

In accordance with the present invention, the problem of shading hereinbefore described is overcome primarily by sizing each depression or arc segment of a depression in accordance with both:

(1) the distance of the respective depression or depression segment from the source of light, and (2) the number of depressions between the respective depression and the source of light.

Taking these two factors into account results in many depressions disposed in an arc segment with the light source at its center each having various depths along the respective arc segment. In that regard, in one embodiment the clear plastic panel is approximately 0.040 inches thick, the leading edge of the depression is typically 45 degrees, the depressions are spaced apart at ½ the thickness of the panel and therefore the maximum depth of each depression is limited to ½ the thickness of the panel so that the leading edge of the depression does not intersect with the training edge of the adjacent depression. Changing the spacing and angle of the leading edge of the depression will change viewing angles and will allow for deeper or shallower maximum depths. Relatively close spacing tends to suppress the fact that each illuminated pattern is comprised of multiple illuminated arc segments, giving the visual impression that the entire pattern is illuminated, particularly if one does not look closely.

Figure 7:
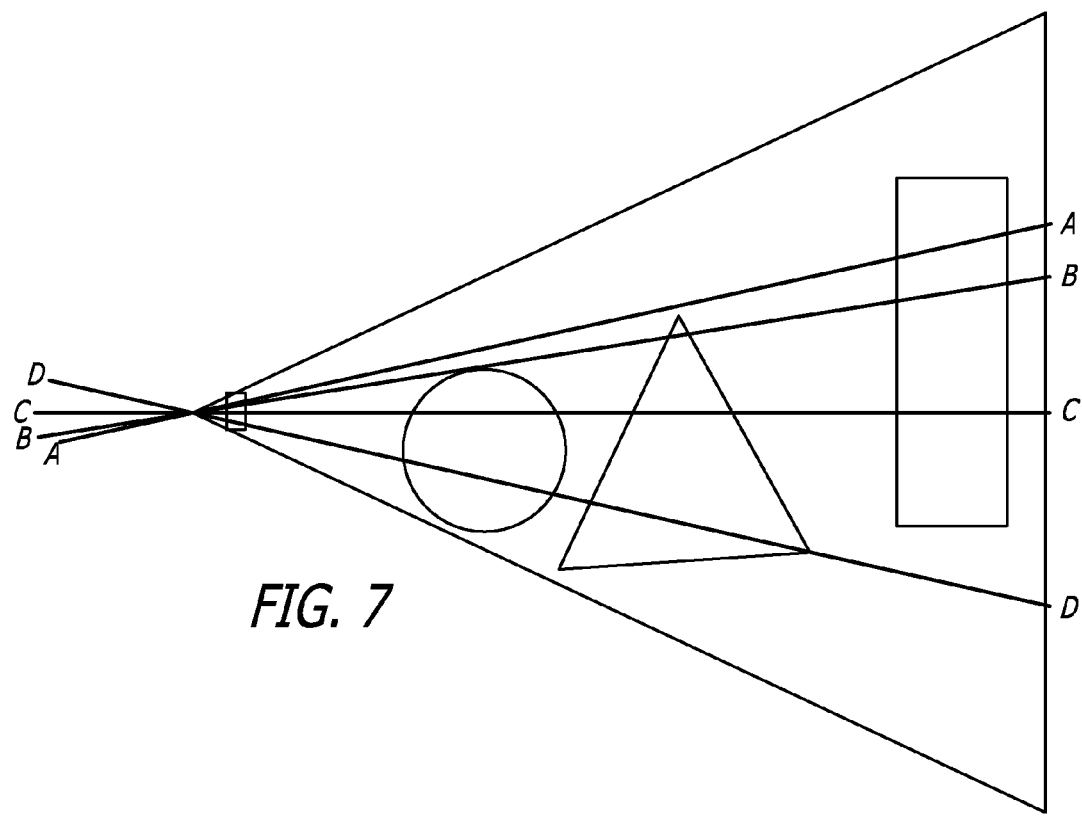
FIG. 7 is a Figure similar to FIG. 1a, though having four rays shown.
Figure 8:
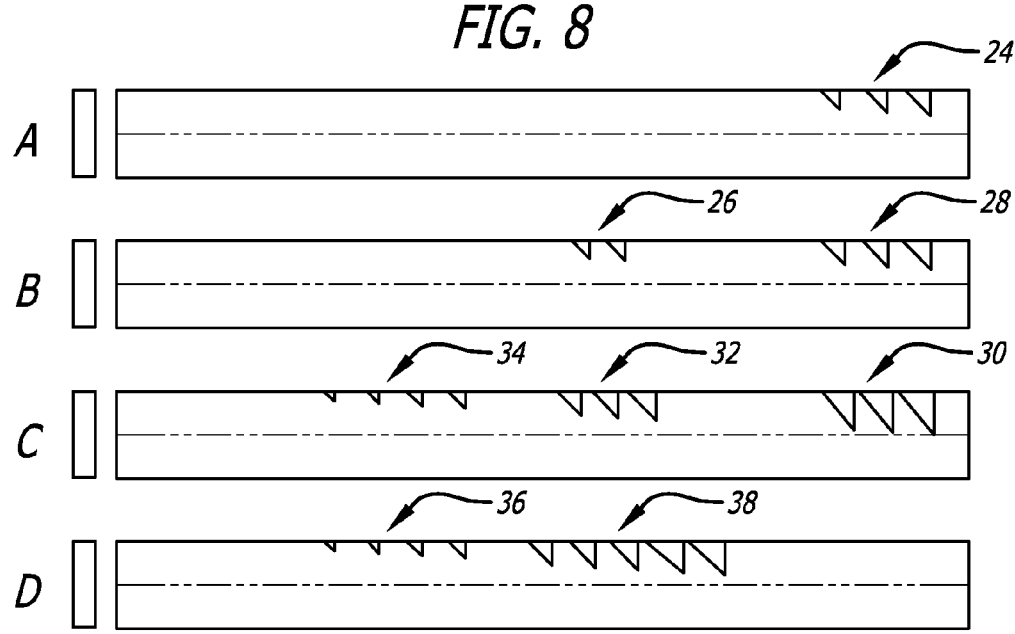
FIG. 8 schematically illustrates the depth of the depressions in each of the patterns of FIG. 7 for each of the rays shown.

The foregoing is schematically illustrated in FIGS. 7 and 8. FIG. 7 is a Figure similar to FIG. 1a, though having four rays shown, with FIG. 8 schematically illustrating the depth of the depressions in each of the patterns of FIG. 7 for each of the rays. In particular, depressions 24 will be deeper than depressions 26 because of being further away from the light source, with depressions 28 being deeper than depressions 24 because of some shading by the depressions 26 for the triangular pattern. Depressions 30, on the other hand, will be the deepest because of depressions 32 and 34, with depressions 32 being deeper than depressions 26 because of the shading of depressions 34 for the circular pattern of FIG. 7. For ray D, depressions 36 will be substantially identical to depressions 34, with depressions 38 starting slightly shallower than depressions 32, not because of having substantially equal shading as ray C from the circular pattern, but because of being slightly closer to the light source. However for ray D, the depressions become progressively deeper so as to approach or possibly equal or slightly exceed the depth of at least the left depression in depressions 30 because of the greater total shading of the lower right hand tip of the triangular pattern in comparison to the shading of the light of ray C when it reaches the left edge of the rectangular pattern of FIG. 7.

Of course, it is difficult to accurately depict the differences in the depth of the depression in a Figure like FIG. 8. Actually, it is also not particularly easy to manually apply the principles of the present invention to obtain the desired results (uniform pattern illumination or elimination of the described shading or shadows) without some iterations. In that regard, some experimentation is well justified, in that the results are most visually pleasing, and once set, a particular product can be replicated indefinitely without having to repeat the process.

It was previously stated that in accordance with the present invention, the problem of shading hereinbefore described is overcome by sizing each depression or arc segment of a depression in accordance with both:

(1) the distance of the respective depression or depression segment from the source of light, and (2) the number and position of depressions between the respective depression and the source of light.

Note that the number of depressions between the respective depression and the light source, to the first order, does not consider the location of the depressions between the respective depression and the source of light. However it has been found that the actual location of depressions between any one depression and the light source has a second order effect, so needs to be considered. Again referring to FIG. 7, the depressions that form the shape of the ball do not cast as dark a shadow on the rectangle as it does on the triangle because the ball is farther away from the rectangle. Additionally the first depression of the ball, triangle or rectangle closest to the light source will reflect more light for a given depression depth than any subsequent depressions. In that regard, the inventors of the present invention have applied the foregoing to a computer program that positions the depressions in an arc having a center at the light source, and sizes each depression or arc segment of a depression in accordance with both:

(1) the distance of the respective depression or depression segment from the source of light, and (2) the number of depressions between the respective depression and the source of light, with a second order correction for the position of depressions between the respective depression and the source of light. This results in a design for the desired illuminated pattern that still can use some tweaking, so to speak, to obtain the desired visual effect, but which is fairly close to a final design. Again, while some iteration is usually needed, the time spent doing so is well worth the impressive results, and once set, the design may be continuously replicated by such means as injection molding of the final product. By stacking panels, each using a different color LED, and by splitting patterns between panels, one overall illuminated pattern of different colors may be generated.

Figure 10:
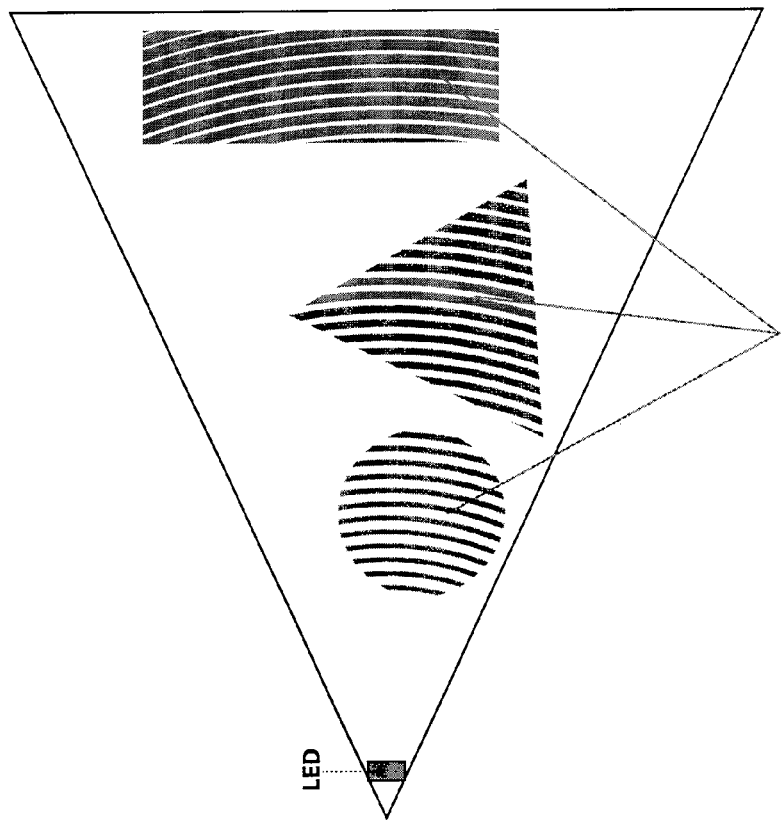
FIG. 10 illustrates a panel having the exemplary patterns formed by depressions.
Figure 9:
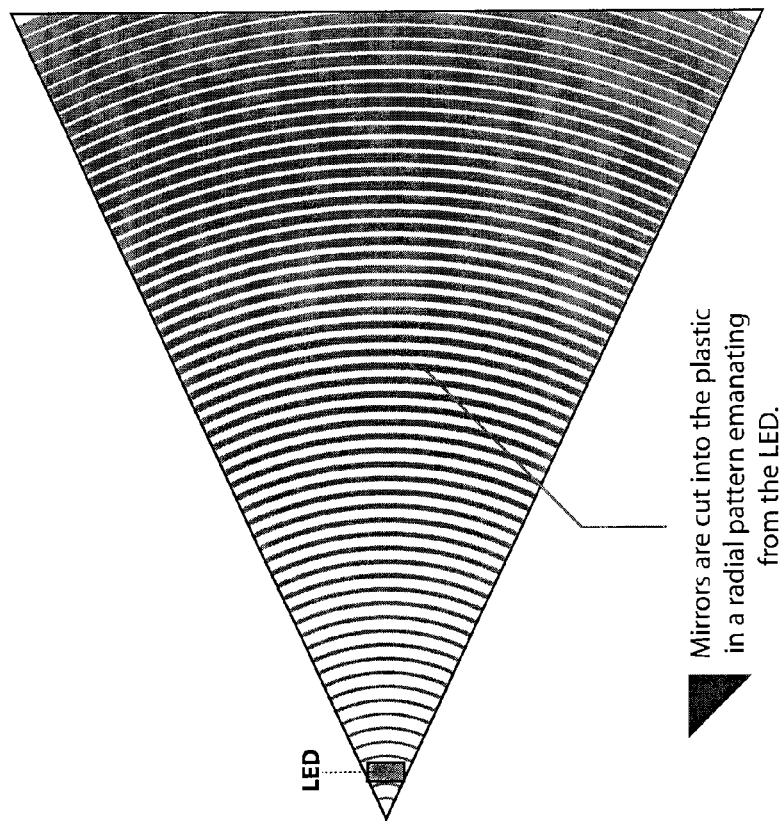
FIG. 9 illustrates that depressions are disposed in an arc shape with the center of the arcs at the light source, or in stacked panels, at the center of the respective light source.

As stated before, the depressions are disposed in an arc shape with the center of the arcs at the light source, or in stacked panels, at the center of the respective light source such as shown in FIG. 9. With the depressions in each arc having the requisite depth, such a panel will be appear to be uniformly lighted, and not have shadows by pattern or pattern part between the shadowed or shaded region and the light source. However, if the exemplary patterns are formed by corresponding depressions, and the rest of the panel is uniformly flat, as in FIG. 10, the shading previously discussed will cause a very undesirable visual effect, namely shadows, though if the depression depths are selected in accordance with the present invention, the undesirable shading effects can be eliminated. In that regard, to a first order, one normally wants a uniform light intensity emitted from all parts of the pattern, particularly when comparing parts of the pattern close to the light source with like parts of the pattern distant from the light source. However, in some cases, it might be desired to emphasize some features of a design over other features, or to locally darken part of a pattern to look like a fold or other three dimensional characteristic of the object depicted by the pattern. As another example, an elongated pattern might be larger and more illuminated at one end than at the other end to make the smaller, less illuminated end is further away from the observer, and may even be laid out to look like it passes behind another, more well illuminated pattern. Such visual effects are also possible using the present invention. The problem with the shading or shadows that the present invention overcomes is that they are radially oriented with respect to the light source, so appear too geometrically oriented to pass as an intended part of the design, and are usually too severe to obtain a decorative pattern.

The present invention has been disclosed and described with respect depressions of a particular configuration. It is possible that depressions of other configurations may also be used, some of which might emit light from the same surface of the transparent panel. Thus the present invention has a number of aspects, which aspects may be practiced alone or in various combinations or sub-combinations, as desired. While certain preferred embodiments of the present invention have been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A light emitting panel for displaying at least one viewable illuminated decorative pattern in a viewable area of the panel comprising:
   a transparent sheet having first and second surfaces bounded by edges;
   an LED light source disposed to couple light into an edge of the transparent sheet at a predetermined location on the edge of the transparent sheet;
   a first decorative pattern formed into the first surface of the transparent sheet to emit light from the source of light primarily from one of the surfaces of the transparent sheet and only in a pattern of the first decorative pattern and any other decorative patterns formed into the first surface of the transparent sheet, all such decorative patterns occupying less than the entire viewable area of the panel;
   the first decorative pattern being defined by depressions in the first surface of the transparent sheet to intercept some light passing through the transparent sheet from the light source and redirect that light out from a surface of the transparent sheet to illuminate the first decorative pattern;
   each depression defining the first decorative pattern being disposed in an arc having a center substantially at the source of light;
   each depression being continuous along its length and having a depth dependent on the combination of:
      the distance of each depression from the source of light; and
      the number of depressions between the respective depression and the source of light:
      the depth of each depression in the first decorative pattern or first decorative pattern part being selected to avoid an apparent shadow in the respective first decorative pattern or first decorative pattern part because of a second decorative pattern or decorative pattern part between the first decorative pattern or decorative pattern part and the light source
      the depressions further away from the light source being deeper than the depressions closer to the light source.

2. The light emitting panel of claim 1 wherein the depth of each depression is selected to provide a desired light uniformity across the illuminated first decorative pattern as viewed from one side of the transparent sheet.

3. The light emitting panel of claim 1 further comprising a second decorative pattern having a second decorative pattern part between a first decorative pattern part and the light source, and wherein the depth of each depression in any first decorative pattern part is selected to avoid an apparent shadow in the first decorative pattern because of the second pattern part between the first decorative pattern part and the light source.

4. The light emitting panel of claim 3 wherein the depth of each respective depression defining the first decorative pattern is also dependent on the position of the depressions defining the second decorative pattern.

5. The light emitting panel of claim 1 wherein the depressions are radially uniformly separated.

6. A light emitting panel for viewably displaying at least two viewable illuminated decorative patterns in a viewable area of the panel comprising:
   a transparent sheet having first and second surfaces bounded by edges;
   an LED light source disposed to couple light into an edge of the transparent sheet at a predetermined location on the edge of the transparent sheet;
   a first decorative pattern formed into the first surface of the transparent sheet to emit light from the source of light from the second surface of the transparent sheet and only in a pattern of the first decorative pattern and any other decorative patterns formed into the first surface of the transparent sheet, all such decorative patterns occupying less than the entire viewable area of the panel;
   the first decorative pattern being defined by depressions in the first surface of the transparent sheet having a first surface of each depression angled with respect to the first surface of the transparent sheet to intercept some light passing through the transparent sheet from the light source and reflecting that light out the second surface of the transparent sheet to illuminate the first decorative pattern;

the first surface of each depression defining the first decorative pattern being disposed in an arc having a center substantially at the source of light;

each depression being continuous along its length and having a depth dependent on the combination of:
   the distance of each depression from the source of light; and
   the number of depressions between the respective depression and the source of light;

the depth of each depression in the first decorative pattern or first decorative pattern part being selected to avoid an apparent shadow in the respective first decorative pattern or first decorative pattern part because of a second decorative pattern or decorative pattern part between the first decorative pattern or decorative pattern part and the light source.

7. The light emitting panel of claim 6 wherein the depth of each respective depression in the first decorative pattern is also dependent on the position of the depressions in a second decorative pattern between the respective depression in the first decorative pattern and the source of light.

8. The light emitting panel of claim 6 wherein the first surface of each depression is angled with respect to the first surface of the transparent sheet by approximately 45 degrees.

9. The light emitting panel of claim 6 wherein the first surface of each depression is made slightly irregular to broaden the viewing angle from the second side of the transparent sheet.

10. The light emitting panel of claim 6 wherein each depression has a substantially triangular cross section defined by the first surface of the respective depression and a second surface substantially perpendicular to the first surface of the transparent sheet.

11. Multiple light emitting panels for collectively displaying multiple viewable illuminated decorative patterns in different colors in a viewable area of the multiple light emitting panels, each light emitting panel having:
   a transparent sheet having first and second surfaces bounded by edges;
   an LED light source disposed to couple light into an edge of the transparent sheet at a predetermined location on the edge of the transparent sheet;
   a first decorative pattern formed into the first surface of the transparent sheet to emit light from the source of light from the second surface of the transparent sheet and only in a pattern of the first decorative pattern and any other decorative patterns formed into the first surface of the transparent sheet, all such decorative patterns occupying less than the entire viewable area of the panel;
   the first decorative pattern being defined by depressions in the first surface of the transparent sheet having a first surface of each depression angled with respect to the first surface of the transparent sheet to intercept some light passing through the transparent sheet from the light source and reflecting that light out the second surface of the transparent sheet to illuminate the first decorative pattern;
   the first surface of each depression defining the first decorative pattern being disposed in an arc having a center substantially at the source of light;
   each depression being continuous along its length and having a depth dependent on the combination of:
      the distance of each depression from the source of light; and
      the number of depressions between the respective depression and the source of light;
   the depth of each depression in the first decorative pattern or first decorative pattern part being selected to avoid an apparent shadow in the respective first decorative pattern or first decorative pattern part because of a second decorative pattern or decorative pattern part between the respective decorative pattern or decorative pattern part and the light source;
   the multiple light emitting panels being stacked with the first surface of each light emitting panel facing the same direction, each light emitting panel having a light source of a different color than the other light emitting panels.

12. The multiple light emitting panels of claim 11 wherein the multiple light emitting panels have multiple decorative patterns thereon.

13. The multiple light emitting panels of claim 12 wherein one light emitting panel has a first part of a decorative pattern thereon, and a second of the light emitting panels has another part of the respective decorative pattern, whereby the respective decorative pattern may be illuminated in different colors.

14. The light emitting panel of claim 11 wherein the sources of light are light emitting diodes (LEDs).

15. The light emitting panel of claim 14 wherein the transparent sheet is blackened adjacent the source of light, to prevent light coupled into the transparent sheet that is of too great an angle with respect to the first and second surfaces of the transparent sheet to reflect off the first and second surfaces of the transparent sheet, from being viewable by a person viewing the lighted replication of the decorative pattern as viewed from the second side of the transparent sheet.

16. A light emitting panel for displaying at least one viewable illuminated decorative pattern in a viewable area of the panel comprising:
   a transparent sheet having first and second surfaces bounded by edges;
   an LED light source disposed to couple light into an edge of the transparent sheet at a predetermined location on the edge of the transparent sheet;
   a decorative pattern formed into the first surface of the transparent sheet to emit light from the source of light primarily from one of the surfaces of the transparent sheet and only in a pattern of the first decorative pattern and any other decorative patterns formed into the first surface of the transparent sheet, all such decorative patterns occupying less than the entire viewable area of the panel;
   the decorative pattern being defined by depressions in the first surface of the transparent sheet to intercept some light passing through the transparent sheet from the light source and redirecting that light out from a surface of the transparent sheet to provide a lighted replication of the decorative pattern;
   each depression defining the decorative pattern being disposed in an arc having a center substantially at the source of light;
   each depression being continuous along its length and having a depth dependent on the combination of:
      the distance of each depression from the source of light; and
      the number of depressions between the respective depression and the source of light;
   the depth of each depression in any decorative pattern or decorative pattern part being selected to avoid an apparent shadow in the respective decorative pattern or decorative pattern part because of another decorative pattern or decorative pattern part between the respective decorative pattern or decorative pattern part and the light source.

17. The light emitting panel of claim 16 wherein the depressions are radially uniformly separated.

18. The light emitting panel of claim 16 wherein the depth of each respective depression is also dependent on the position of the depressions between the respective depression and the source of light.

19. The light emitting panel of claim 18 wherein the depth of each depression is selected to provide a desired uniformity across the lighted replication of the decorative pattern as viewed from one side of the transparent sheet.

* * * * *